United States Patent
Cournoyer et al.

(10) Patent No.: US 7,062,125 B2
(45) Date of Patent: Jun. 13, 2006

(54) PRISMATIC REFLECTION OPTICAL WAVEGUIDE DEVICE

(75) Inventors: Alain Cournoyer, Québec (CA); Marc Levesque, St-Augustin-de-Desmaures (CA)

(73) Assignee: Institut National d'Optique, Quebec (CA)

( * ) Notice: Subject to any disclaimer, the term of this patent is extended or adjusted under 35 U.S.C. 154(b) by 234 days.

(21) Appl. No.: 10/408,889

(22) Filed: Apr. 8, 2003

(65) Prior Publication Data

US 2004/0202424 A1    Oct. 14, 2004

(51) Int. Cl.
*G02B 6/34*    (2006.01)
*G02B 6/26*    (2006.01)

(52) U.S. Cl. .............................. 385/36; 385/39; 385/47
(58) Field of Classification Search .................. 385/14, 385/47, 92, 36, 39, 132
See application file for complete search history.

(56) References Cited

U.S. PATENT DOCUMENTS

| | | | |
|---|---|---|---|
| 4,187,025 A | 2/1980 | Harmer | 356/133 |
| 4,240,747 A | 12/1980 | Harmer | 356/133 |
| 4,427,293 A | 1/1984 | Harmer | 356/133 |
| 4,433,913 A | 2/1984 | Harmer | 356/133 |
| 4,468,567 A | 8/1984 | Sasano et al. | 250/577 |
| 4,564,292 A | 1/1986 | Omet | 356/133 |
| 4,639,594 A | 1/1987 | Schoch et al. | 250/227 |
| 4,806,013 A | 2/1989 | Bodenheimer et al. | 356/133 |
| 4,851,817 A | 7/1989 | Brossia et al. | 340/583 |
| 4,994,682 A | 2/1991 | Woodside | 250/577 |
| 5,097,479 A * | 3/1992 | Opower | 372/95 |
| 5,141,310 A | 8/1992 | Boiarski | 356/133 |
| 5,585,634 A | 12/1996 | Stevenson et al. | 250/339.11 |
| 5,699,461 A | 12/1997 | Minemoto et al. | 385/12 |
| 5,894,535 A * | 4/1999 | Lemoff et al. | 385/47 |
| 6,003,340 A | 12/1999 | Borak et al. | 65/392 |
| 6,130,439 A | 10/2000 | Le Menn | 250/573 |
| 6,491,447 B1 * | 12/2002 | Aihara | 385/92 |
| 6,516,131 B1 * | 2/2003 | Tullis | 385/137 |
| 6,542,671 B1 * | 4/2003 | Ma et al. | 385/47 |
| 6,839,476 B1 * | 1/2005 | Kim et al. | 385/14 |

OTHER PUBLICATIONS

Isabelle Noiseux, William Long, Alain Cournoyer, and Marcia Vernon, "Simple Fiber-Optic-Based Sensors for Process Monitoring: An Application in Wine Quality Control Monitoring", Applied Spectroscopy, vol. 58, No. 8, 2004, pp. 1010-1019.

* cited by examiner

*Primary Examiner*—Frank G. Font
*Assistant Examiner*—Mary El-Shammaa
(74) *Attorney, Agent, or Firm*—Merchant & Gould P.C.

(57) ABSTRACT

A prismatic reflection optical waveguide device having an input and an output optical waveguide segments and a reflection interface provided therebetween apt to convey a light beam from one direction to another, wherein the light beam is conveyed by a single reflection on the reflection interface. Such a prismatic reflection optical waveguide device may, for example, be used as an optical waveguide sensor for measuring the refractive index of a sample medium. The measuring range and/or the sensitivity of such an optical waveguide sensor may be adjusted according to a particular application. Such a prismatic reflection optical waveguide device may also be used as a generally lossless bent optical waveguide wherein the reflection interface works as a mirror for reflecting the light beam coming from the input segment to the output segment, thereby providing a generally lossless transmission.

9 Claims, 5 Drawing Sheets

PRISMATIC REFLECTION OPTICAL WAVEGUIDE DEVICE

FIELD OF THE INVENTION

The present invention relates to optical waveguide devices and more particularly concerns a prismatic reflection optical waveguide device. This device may for example be used as an optical waveguide sensor for measuring the refractive index of a sample medium or as an efficient bent optical waveguide.

BACKGROUND OF THE INVENTION

Recently, several refractometers based on the transmission of light through a sensor have been produced for measuring different physical properties of a medium, such as, for example, the index of refraction of a fluid. Most of such refractometers use an optical fiber in which the sensing element is a curved section of the fiber. An optical fiber generally has a core of transparent material of refractive index $n_{co}$ surrounded by a layer of transparent cladding material having a refractive index $n_2$ which is lower than $n_{co}$. The core of the curved section is exposed to the medium to be analysed. Such a refractometer is generally provided with a light source that illuminates the sensing element, a photodetector for detecting the light transmitted via the sensing element and a processor with which the refractive index of the fluid can be determined from the light that reaches the photodetector. Most of these prior art devices describe a sensing element which is U-shaped.

For example, A. L. Harmer of Battelle Memorial Institute obtained a series of patents in the early 1980's (U.S. Pat. Nos. 4,187,025; 4,240,747; 4,427,293; and 4,433,913) which disclose several fibre optic sensors in which the sensing element is a curved section of the fibre. More particularly, U.S. Pat. No. 4,433,913 describes an apparatus for determining the index of refraction of a fluid including a light source, a light detector and means forming a bent light-conducting path between the source and the detector such that the intensity of the detected illumination is representative of the refractive index of the fluid surrounding the light-conductive path. Harmer also mentions that a bent light-conducting path having more than one curved section will provide a higher sensitivity than a single curved section.

Also of interest is U.S. Pat. No. 4,468,567 issued to N. Sasano et al. disclosing a liquid level detecting device having a low transmission loss. This liquid level detector includes two or more optical fibres which are placed such that their ends are adjacent either in a parallel relationship or forming an acute angle with each other. The sensing element of Sasano consists of a spherical portion formed by fusing the end portions of the optical fibres.

R. Omet in U.S. Pat. No. 4,564,292 discloses a refractometer which uses two U-shaped optical fibres, one serving as the reference and the other for the sample to be analysed. Schoch et al, in U.S. Pat. No. 4,639,594, uses the same two fibres configuration for a liquid level sensor, wherein a reference liquid is sealed into the reference chamber.

In U.S. Pat. No. 4,806,013, J. S. Bodenheimer et al. describe the use of a single U-shaped optical fibre as a refractive index sensor wherein the bent portion must have a radius of curvature at least ten and at most two hundred times larger than the fibre diameter. They state that the low sensitivity of the U-sensor mentioned by Harmer and others is due to the selection of a too small bent radius. They give an empirical formula for calculating the minimum bent radius for various indices of refraction.

In U.S. Pat. No. 4,851,817, C. E. Brossia et al. disclose a system for automatic and real time detection of water and icing on surfaces by monitoring variations in light energy transmitted through an optical fiber having a sensitive probe area being U-shaped. The sensitive probe area is positioned on, about or within the surface on which icing is to be detected. Because of differences in optical indices of refraction and energy absorption characteristics of air, water and ice, the presence of each of these at the processed sensitive area will cause a proportional and characteristic attenuation of the light energy passing through the optical fiber. Changes in light energy transmission can be interpreted automatically to provide an indication of icing.

In U.S. Pat. No. 5,141,310, A. A. Boiarski discloses a sensor for measuring the specific gravity of a liquid, in particular urine, wherein the sensing element, which can be a specifically shaped optical fiber, is provided with multiple reverse bends. The sensing element measures the refractive index which is then related to specific gravity.

W. A. Stevenson et al., in U.S. Pat. No. 5,585,634, disclose the use of an optical fiber as a multiple internal reflection (MIR) sensor for performing both emission spectroscopy and absorption spectroscopic measurements of highly absorbing or highly scattering material, a technique sometimes referred to as attenuated total reflectance (ATR) or evanescent wave spectroscopy. More particularly, this patent discloses a U-shaped fibre optic sensor for spectroscopic monitoring wherein the core at the U is exposed to the material.

U.S. Pat. No. 5,699,461 issued to H. Minemoto et al. discloses the use of a U-shaped optical fiber which fits into the groove pattern of a substrate. The applications of such a sensor are magnetic field/current, electric field/voltage and temperature sensors.

G. Borak et al., in U.S. Pat. No. 6,003,340, describe a method by which a fiber is bent into a multiple bends shape by heating with a laser beam and by which method they produce a sensor sensitive to strain.

Even if all these prior art devices seems to well fulfil their task, the attenuation of light due to the bending of the optical fiber complicates the analysis of the light reaching the detector.

Other types of refractometers have also been developed. An example is U.S. Pat. No. 4,994,682 issued to S. H. Woodside which discloses a liquid level sensor using two optical fibres to detect liquid levels. There are notches along the length on one side of each of two fibres. The fibres act independently and thus serve for ratio measurements. In one embodiment a V-shaped substrate acts as a waveguide between the two fibres.

Another patent that mentions the use of a notched optical fibre for the measurement of refractive index is U.S. Pat. No. 6,130,439 issued to M. LeMenn. In this patent, M. LeMenn describes a sensor element which includes a machined groove and a surface which is parallel to the groove. The sensing principle is the detection of interference fringes, the movement of which is a function of refractive index changes of the liquid surrounding the sensor.

All of the devices discussed above present the major drawback that the light reflected by the sensing area is quite complicated to analyse due to the multiple reflections of the light beam at the level of the interface. Therefore, there is a need for a more simple sensing device that would overcome the disadvantages of the prior art devices by providing a sensor wherein a single reflection occurs at the level of the sensing area.

On the other hand, optical waveguides, which are well known transmission medium for optical communications systems also are generally optical fiber based. According to their construction, optical waveguides cannot accept important curvatures without generating significant attenuation losses. Indeed, bending an optical fiber beyond a particular curvature will generate some guiding losses which will increase with the curvature of the optical waveguide. The more the optical fiber is bent, the more guiding losses increase. Although the theory of optical waveguides has been known for a long time, practical optical waveguide devices that can be bent without generating important transmission losses are still unavailable. More particularly, the increasing need for miniaturised optical communication systems using optical waveguides requires more efficient bent waveguides in order to achieve an improved miniaturisation. A efficient bent waveguide may also be useful in many other applications.

There is therefore a need for an integrated bent optical waveguide device that would be able to transmit a light beam from one direction to another without the transmission loss that occurs with the conventional optical couplers actually available.

SUMMARY OF THE INVENTION

Accordingly, it is an object of the present invention to provide a practical prismatic reflection optical waveguide device apt to convey a light beam coming from one direction to another.

It is a preferable object of the present invention to provide such an optical waveguide device wherein the light beam is conveyed from the input segment to the output segment by a single reflection on a reflection interface.

It is another preferable object of the present invention to provide such an optical waveguide device including a plurality of reflection interfaces, the light beam being conveyed by a single reflection occurring on each of the reflection interfaces.

It is another object of the present invention to provide a simple optical waveguide sensor for measuring the refractive index of a sample medium.

It is another preferable object of the present invention to provide such an optical waveguide sensor allowing an adjustment of the measuring range and/or the sensitivity of the sensor according to a particular application.

It is another object of the present invention to provide a bent optical waveguide device able to transmit a light beam from one direction to another without transmission loss.

According to a first aspect of the present invention, there is provided a prismatic reflection optical waveguide device including a pair of input and output optical waveguide segments, each being respectively provided with a core for propagating a light beam along its light guiding axis. Each segment is also provided with a coupling end and a free end opposed thereto. The coupling ends of the input and output waveguide segments define a coupling portion where the coupling ends are arranged in adjacent V-shaped relationship forming a predetermined angle α with each other. Thus, the cores of the input and output segments at the coupling ends thereof form a continuous core portion for conveying the light beam. The continuous core portion has a substantially flattened surface in the coupling portion defining a reflection interface apt to convey the light beam coming from the input segment into the output segment by a single reflection thereof.

Preferably, the reflection interface in the continuous core portion is plane and extends centrally therein, at an intersection of each light guiding axis of each optical waveguide segment. Moreover, the plane surface of the reflection interface preferably forms an angle ($\pi/2-\alpha/2$) with respect to the light guiding axis of each optical waveguide segment.

According to another aspect of the present invention, there is also provided an optical waveguide sensor for measuring the refractive index of a medium using a light beam. The present optical waveguide sensor offers a high sensitivity over an adjustable range of refractive indices. The optical waveguide sensor includes a sensing optical waveguide device having a light inlet and a light outlet for transmitting the light beam therebetween. The sensing optical waveguide device includes a pair of input and output optical waveguide segments, each being respectively provided with a core for propagating the light beam along its light guiding axis. Each segment is also provided with a coupling end and a free end opposed thereto. The coupling ends of the input and output waveguide segments define a coupling portion where the coupling ends are arranged in adjacent V-shaped relationship forming a predetermined angle α with each other. Thus, the cores of the input and output segments at the coupling ends thereof form a continuous core portion for conveying the light beam. The continuous core portion has a substantially flattened surface in the coupling portion providing a sensing reflection interface apt to reflect a fraction of the light beam coming from the input segment into the output segment by a single reflection thereof. The fraction depends on several preselected parameters and also on the refractive index of the medium when the coupling portion is exposed thereto. The optical waveguide sensor also includes a light source connected to the inlet of the sensing optical waveguide device for generating the light beam and launching the same into the input optical waveguide segment. The optical waveguide sensor is also provided with a light detector connected to the outlet of the sensing optical waveguide device for receiving the fraction of the light beam from the output optical waveguide segment. Finally, the optical waveguide sensor is provided with a processing means for determining the refractive index of the medium from the fraction of the light beam received by the light detector.

According to yet another aspect of the present invention, there is also provided a bent optical waveguide device having a light inlet and a light outlet for transmitting a light beam therebetween. The bent optical waveguide device includes an input and an output optical waveguide segments, each being respectively provided with a core for propagating the light beam. Each segment is also provided with a coupling end and a free end opposed thereto. The coupling ends of the input and output waveguide segments define a coupling portion where the coupling ends are arranged in adjacent V-shaped relationship forming a predetermined angle α with each other. Consequently, the cores of the input and output segments at the coupling ends thereof, form a continuous core portion for conveying the light beam. The coupling portion has a substantially flattened surface in the coupling portion providing a reflection interface working as a mirror for reflecting the light beam coming from the input segment into the output segment by a single reflection thereof. The angle α thus has a value selected to provide a generally lossless transmission of the light beam between the input and output optical waveguide segments.

Other aspects and advantages of the present invention will be better understood upon reading preferred embodiments thereof with reference to the appended drawings.

BRIEF DESCRIPTION OF THE DRAWINGS

These and other objects and advantages of the invention will become apparent upon reading the detailed description and upon referring to the drawings in which.

Figure 1:
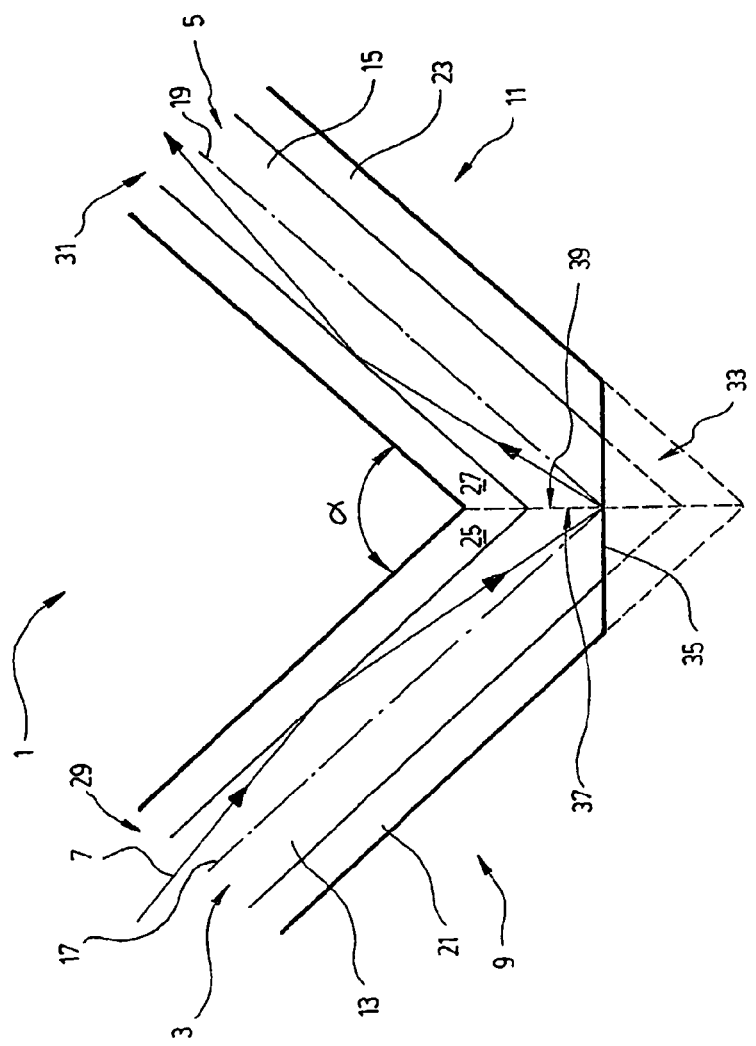
FIG. 1 is a front sectional view of a prismatic reflection optical waveguide device according to a preferred embodiment of the present invention.

While the invention will be described in conjunction with an example embodiment, it will be understood that it is not intended to limit the scope of the invention to such embodiment. On the contrary, it is intended to cover all alternatives, modifications and equivalents as may be included as defined by the appended claims.

DESCRIPTION OF A PREFERRED EMBODIMENT

In the following description, similar features in the drawings have been given similar reference numerals and in order to weigh down the figures, some elements are not referred to in some figures if they were already identified in a preceding figure.

The present invention concerns a prismatic reflection optical waveguide device that can be useful in many different applications. For example, the prismatic reflection optical waveguide device may be used as a sensing device in a sensor that measures the refractive index of a medium. Such a prismatic reflection device may also be used in physical optics as an integrated bent optical waveguide for transmitting a light beam from one direction to another without generating the transmission loss that generally occurs with conventional optical couplers.

Referring to FIG. 1, there is shown a prismatic reflection optical waveguide device according to a preferred embodiment of the invention. The prismatic reflection optical waveguide device 1 has a pair of input and output optical waveguide segments 9 and 11. Such optical waveguide segments could be standard optical fiber having a cladding surrounding the core, step index fiber or graded index fiber. Moreover, the segments 9, 11 could be any type of waveguides. Thus, even if preferred embodiments are illustrated and described in using optical fiber segments, it must be understood that any type of waveguide segments could also be conveniently used. As illustrated, each segment 9, 11 is respectively provided with a core 13, 15 for propagating the light beam 7 along its light guiding axis 17, 19. Each segment 9, 11 may also be provided with a cladding 21, 23 respectively surrounding each core 13, 15. Each segment 9, 11 further includes a coupling end 25, 27 and a free end 29, 31 opposed thereto. The coupling ends 25, 27 of the input and output waveguide segments 9, 11 define a coupling portion 33 where the coupling ends 25, 27 are arranged in adjacent V-shaped relationship forming a predetermined angle α with each other. In this way, the cores 13, 15 of the input and output segments 9, 11 at the coupling ends 25, 27 thereof form a continuous core portion for conveying the light beam 7. Furthermore, the coupling portion 33 is provided with a substantially flattened surface providing a reflection interface 35 in the continuous core portion apt to reflect the light beam 7 coming from the input segment 9 into the output segment 11 by a single reflection thereof.

The flattened surface may be slightly curved within the limit that the curvature radius thereof is greater that the curvature radius of the continuous core portion. It is to be understood that throughout the present description, the expression "substantially flattened surface" is intended to cover such a slightly curved surface. Moreover, it should be noted that, given the fact that an optical waveguide has a numerical aperture, the more angularly oriented light beams entering in the input optical waveguide segment 9 may have more than a single reflection on the reflection interface 35. For example, some light beams may reflect twice on the reflection interface 35 before reaching the output optical segment 11. However, the vast majority of the light beam of a given signal will respect the single-reflection condition, and discrepancies will not substantially affect the good working of the present invention.

Such a prismatic reflection optical waveguide device 1 may be obtained from different methods which are well known in the art. For example, a first such method uses two distinct optical waveguide segments which are connected together, whereas a second method uses a single optical waveguide portion which is bent.

Still referring to FIG. 1, in a first preferred embodiment, the input and output optical waveguide segments 9, 11 are distinct segments which are connected together. The coupling ends 25, 27 of each segment 9, 11 are respectively provided with an end surface 37, 39 forming an angle α/2 with the light guiding axis 17, 19 of the corresponding waveguide segment 9, 11. The two end surfaces 37, 39, are preferably plane and may for example be obtained from a cutting or polishing of the coupling end of each optical segment 9, 11. They are then connected flush with each other by any appropriate connecting means such as, but not limited to, for example a welding or a glue having a refractive index matching the refractive index of the continuous core portion for allowing the transmission of the light beam 7 from the input segment 9 to the output segment 11. If a welding is used, a laser-based welding is preferable. Any other connecting means preventing Fresnel losses at the interface between the two end surfaces 37, 39 of the input and output segments 9, 11 could also be used and is believed to be within the limits of the present invention. For example, the connecting means may include a liquid having a refractive index substantially matching a refractive index of the core portions and extending therebetween. Then a mechanical holder can be used for keeping in place the two end surfaces 37, 39.

In a second preferred embodiment, the input and the output optical waveguide segments 9, 11 are in integral relationship with each other in a single bent optical waveguide. To obtain such a single bent optical waveguide, one can heat a single optical waveguide before bending it, as known in the art.

Concerning the two previous embodiments, the reflection interface 35 in the continuous core portion is preferably a plane surface. More preferably, the plane surface of the reflection interface 35 forms an angle (π/2-α/2) with respect to the light guiding axis 17, 19 of each optical segment 9, 11. Even more preferably, the reflection interface 35 extends centrally into the continuous core portion, crossing the intersection of the light guiding axes of the input and output optical segments 9, 11, as illustrated in FIG. 1. The smoothing process of the coupling portion 33 which provides the reflection interface 35 may be a polishing or even a cutting. However, any other convenient means for smoothing the coupling portion 33 may also be used. Such methods are well known in the art.

In another preferred embodiment, the prismatic device 1 is provided with a plurality of pairs of input and output optical waveguide segments 9, 11. Each pair is optically coupled to one another in a consecutive arrangement for providing a plurality of reflection interfaces 35 along a path of the light beam 7. As described above, each optical waveguide segment 9, 11 may be distinct segments that are connected together. However, in a preferred embodiment, each optical waveguide segment 9, 11 is in integral relationship with each others in a single bent optical waveguide.

Therefore, such a prismatic reflection optical waveguide device 1 may advantageously be used in the applications wherein existing prismatic reflection devices are usually used. Such applications may be, for example, but not limited to, light beam redirection, ATR spectroscopy, evanescent wave distance measurement, prismatic coupling or even refractive indices measuring. However, the present prismatic reflection device is optical waveguide based and therefore, it will convey light beams having a numerical aperture which is not null.

Figure 2:
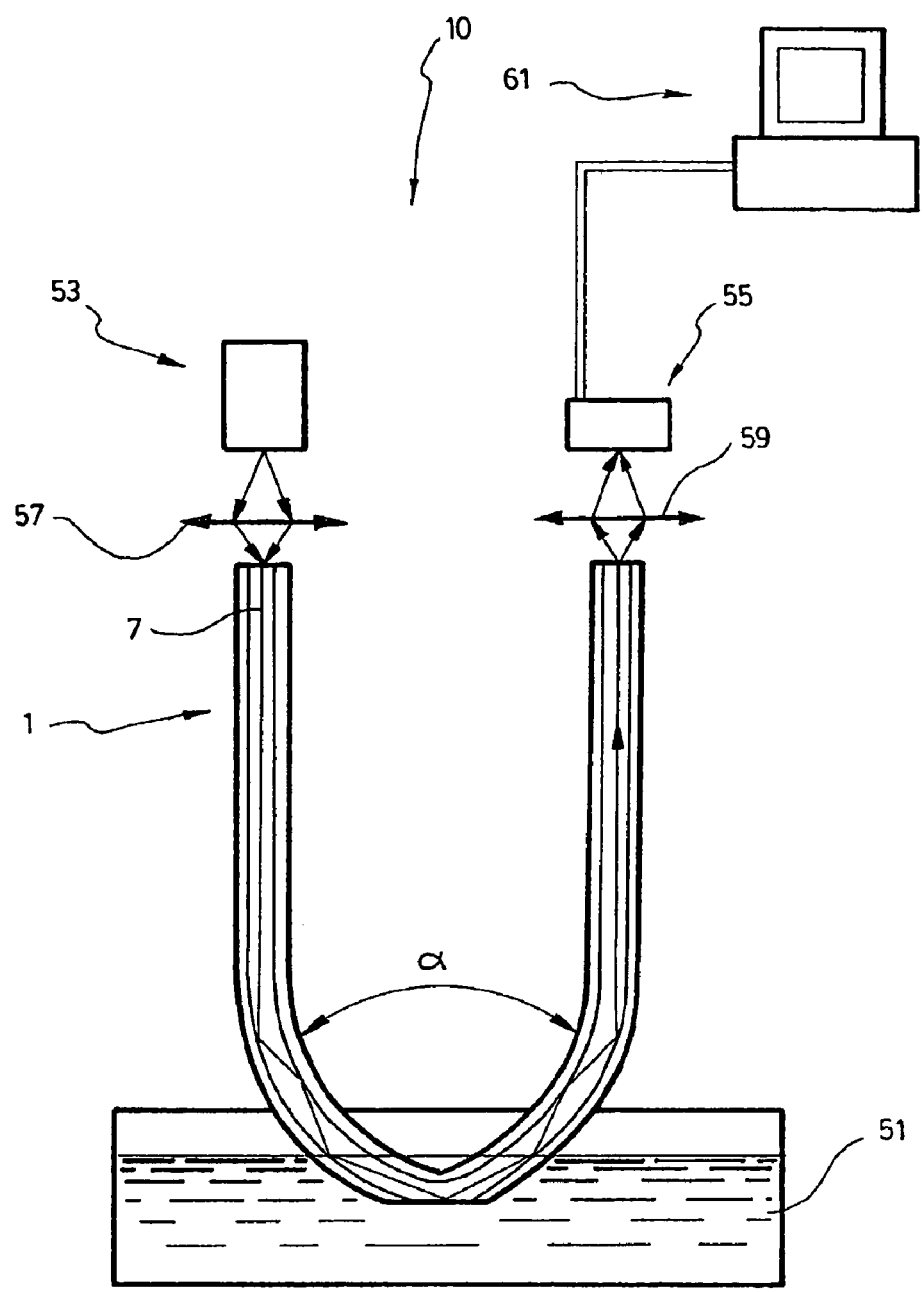
FIG. 2 is a general diagram showing an optical waveguide sensor using a prismatic reflection optical waveguide device according to another preferred embodiment of the present invention.

As mentioned above, the prismatic reflection optical waveguide device 1 finds applications in the field of refractive indices measuring. Referring now to FIG. 2, there is shown an optical waveguide sensor 10 for measuring the refractive index of a medium 51 using a light beam 7. The sensor 10 is well adapted to the particular analysis of liquids, but it could also be used for the analysis of a gas or even a paste. The optical waveguide sensor 10 according to the present invention has a great sensitivity over an adjustable range of refractive indices. The optical waveguide sensor 10 is provided with a sensing optical waveguide device 1 having a light inlet 3 and a light outlet 5 for transmitting the light beam 7 therebetween. Referring also to FIG. 1, the sensing optical waveguide device includes a pair of input and output optical waveguide segments 9 and 11. Each segment 9, 11 is respectively provided with a core 13, 15 for propagating the light beam 7 along its light guiding axis 17, 19. As illustrated, each segment 9, 11 may also be provided with a cladding 21, 23 surrounding the core 13, 15. Each segment 9, 11 further includes a coupling end 25, 27 and a free end 29, 31 opposed thereto. The coupling ends 25, 27 of the input and output waveguide segments 9 and 11 define a coupling portion 33 where the coupling ends 25, 27 are arranged in adjacent V-shaped relationship forming a predetermined angle α with each other. Thus, the cores 13, 15 of the input and output segments 9, 11 at the coupling ends 25, 27 thereof, form a continuous core portion for conveying the light beam 7. Furthermore, the continuous core portion is provided with a substantially flattened surface providing a sensing reflection interface 35 apt to reflect a fraction of the light beam 7 coming from the input segment 9 into the output segment 11 by a single reflection thereof. The fraction of the light beam 7 reflected into the output segment 11 depends on the refractive index of the medium 51 when the coupling portion is exposed thereto. As illustrated in FIG. 2, the sensing reflection interface 35 may be immersed into the medium 51 under analysis. The optical waveguide sensor 10 is also provided with a light source 53 connected to the inlet 3 of the sensing optical waveguide device for generating the light beam 7 and launching it into the input optical waveguide segment 9. An input optical assembly 57 including any appropriate number of lenses or other optical components may advantageously be inserted between the light source 53 and the inlet 3 of the input optical waveguide segment 9, for more efficiently coupling the light source 53 to the inlet 3 of the input optical waveguide segment 9. The light source 53 may be, for example, a monochromatic source. The optical waveguide sensor 10 is also provided with a light detector 55 connected to the outlet 5 of the sensing optical waveguide device 1 for receiving the fraction of the light beam 7 reflected into the output optical waveguide segment 11. An output optical assembly 59 may also advantageously be inserted between the light detector 55 and the outlet 5 of the output optical waveguide segment 11 for more efficiently coupling the light detector 55 to the outlet 5 of the output optical waveguide segment 11. The optical waveguide sensor 10 is finally provided with a processing means 61 for determining the refractive index of the medium from the fraction of the light beam 7 received by the light detector 55.

So as to simplify the interpretation of the fraction of the light beam 7 outgoing from the output optical waveguide segment 11, the sensing reflection interface 35 in the continuous core portion is advantageously a plane surface. Moreover, the plane surface of the reflection interface 35 preferably forms an angle (π/2-α/2) with respect to the light guiding axis 17, 19 of each optical waveguide segment 9 and 11 for providing an incidence angle α/2 on the reflection interface 35. Furthermore, so as to maximise the sensitivity of the optical waveguide sensor 10, the sensing reflection interface 35 preferably extends centrally into the continuous core portion, crossing the intersection of the light guiding axis 17, 19 of the optical waveguide segments 9, 11. With such a preferred embodiment, there is only one reflection on the sensing reflection interface 35, thereby again simplifying the analysis of the fraction of the light beam 7 reaching the light detector 55. It should be understood that, due to the numerical aperture of the optical waveguide segment 9, 11, this condition applies to most but not necessarily all of the light beams 7, as explained above.

From a theoretical point of view, it is well known in the art that a plane wave incident on a material interface at an angle α/2 will undergo total internal reflection if α/2 is greater than a critical angle given by:

$$\sin(\alpha/2)_{cr} = n_2/n_{co}$$

where $n_{co}$ is the refractive index of the core of the optical waveguide whereas $n_2$ is the refractive index of the medium under analysis. Thus, the light beam transmitted to the output segment 11 will be modified according to the refractive indices of the continuous core portion and of the medium in which the reflection interface 35 is exposed. However, the previous theoretical formula supposes the use of a parallel light beam, i.e. transmitted by a waveguide which has a numerical aperture equal to 0. This is not the case with a real optical waveguide. The more the numerical aperture of the optical waveguide segment increases, the more the angular content of the light beam 7 reaching the reflection interface 35 increases too. This generates a reduction of the sensitivity of the sensor but the range of measurable refractive indices increases. Thus, the numerical aperture of the optical waveguide segments 9 and 11 is an additional parameter which can be adjusted according to a particular application.

The reflectivity of the reflection interface 35 is a function of the refractive indices of the core of the optical waveguide and of the medium 51. This reflectivity is calculated using the Fresnel equations:

$$r_s = (n_{co} * \cos(\alpha/2) - n_2 * \cos \sigma) / (n_{co} * \cos(\alpha/2) + n_2 * \cos \sigma)$$

$$r_p = (n_2 * \cos(\alpha/2) - n_{co} * \cos \sigma) / (n_2 * \cos(\alpha/2) + n_{co} * \cos \sigma)$$

and Snell's law: $\cos^2 \sigma = 1 - (n_{co}/n_2)^2 * \sin^2(\alpha/2)$

The s and p indexes refer to two orthogonal states of polarisation. The s-polarised mode is called tranverse electric (TE) polarisation or "orthogonal" polarisation, since the electric field is orthogonal to the plane of incidence. The p-polarised mode is called tranverse magnetic (TM) polarisation since the magnetic field is orthogonal to the plane of incidence, or "parallel" polarisation since the electric field is parallel to the plane of incidence. It is advantageous, but not essential, to know the state of polarisation of the light used in this kind of measurement in order to use the Fresnel equations. Therefore, the input and output optical waveguide segments 9 and 11 are preferably polarisation maintaining optical fibers so as to ensure that the polarisation state used is kept while propagating in the optical waveguide. In this case, the optical power reflection coefficient R measured by the light detector 55 is given by $R = |r|^2$. In the case of random polarisation, the optical power reflection coefficient R is given by $R = (|r_s|^2 + |r_p|^2)/2$.

Therefore, there are several adjustable parameters for determining the range of refractive indices that can be measured as well as the sensitivity of the sensor 10. The parameters that can be chosen are the angle $\alpha$ between the input and the output optical waveguide segments 9 and 11, the numerical aperture of the segments 9 and 11, the refractive index $n_{co}$ of the core of the optical waveguide segments 9 and 11, the polarisation of the light beam 7 and the wavelength of the light beam 7. The sensor 10 is thus able to measure a refractive index comprised between 1 and $n_{co}$.

Figure 3:
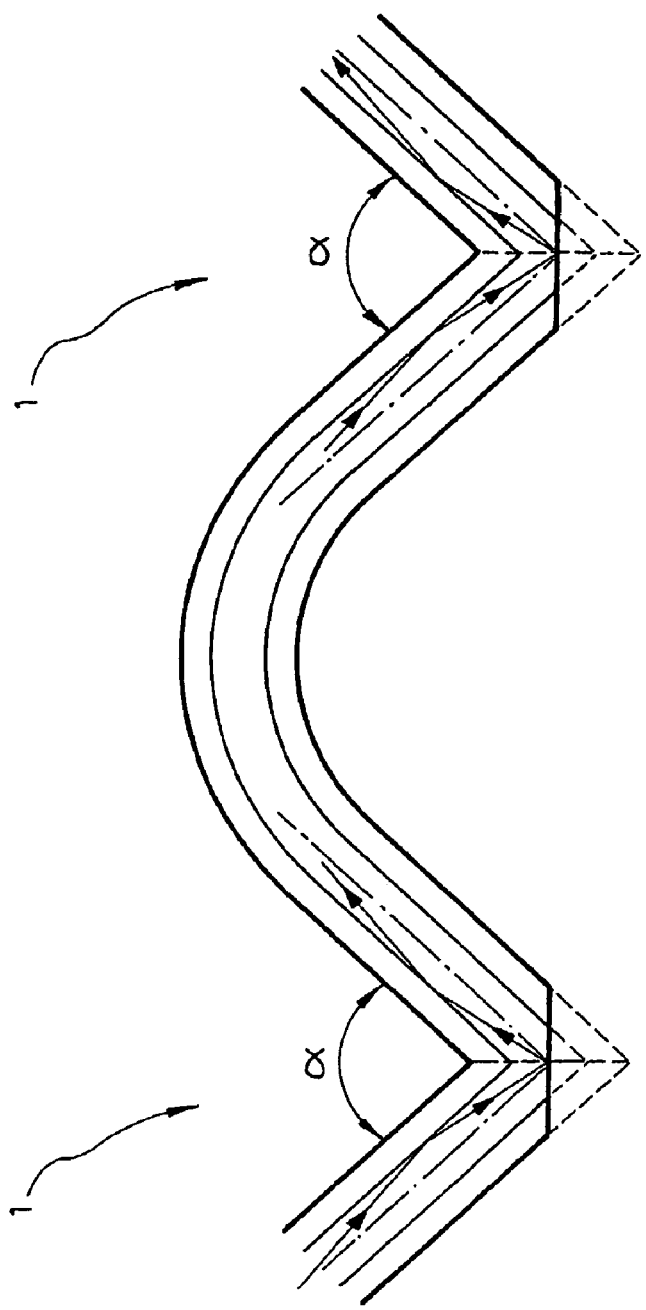
FIG. 3 is a general diagram showing a sensing optical waveguide device of an optical waveguide sensor according to another preferred embodiment of the present invention.
Figure 4:
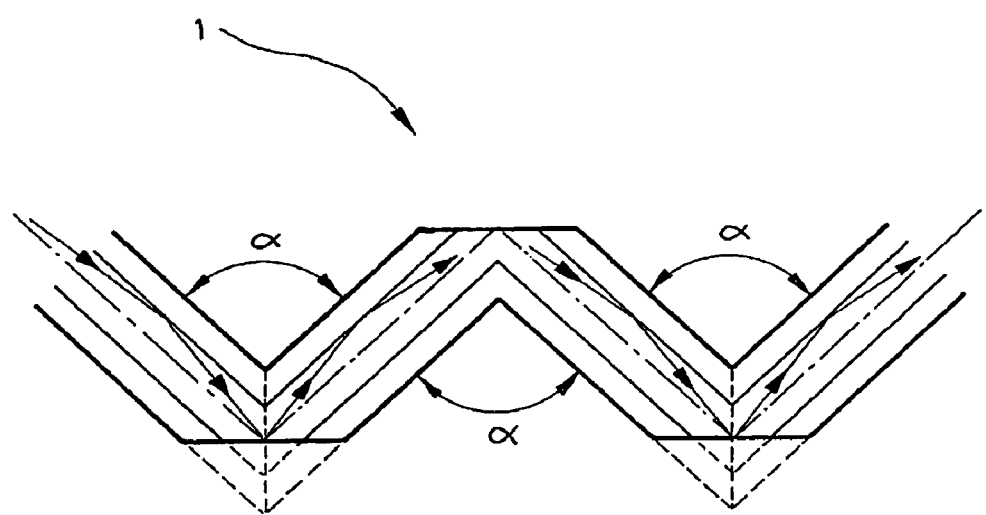
FIG. 4 is a general diagram showing another sensing optical waveguide device of an optical waveguide sensor according to another preferred embodiment of the present invention.
Figure 5:
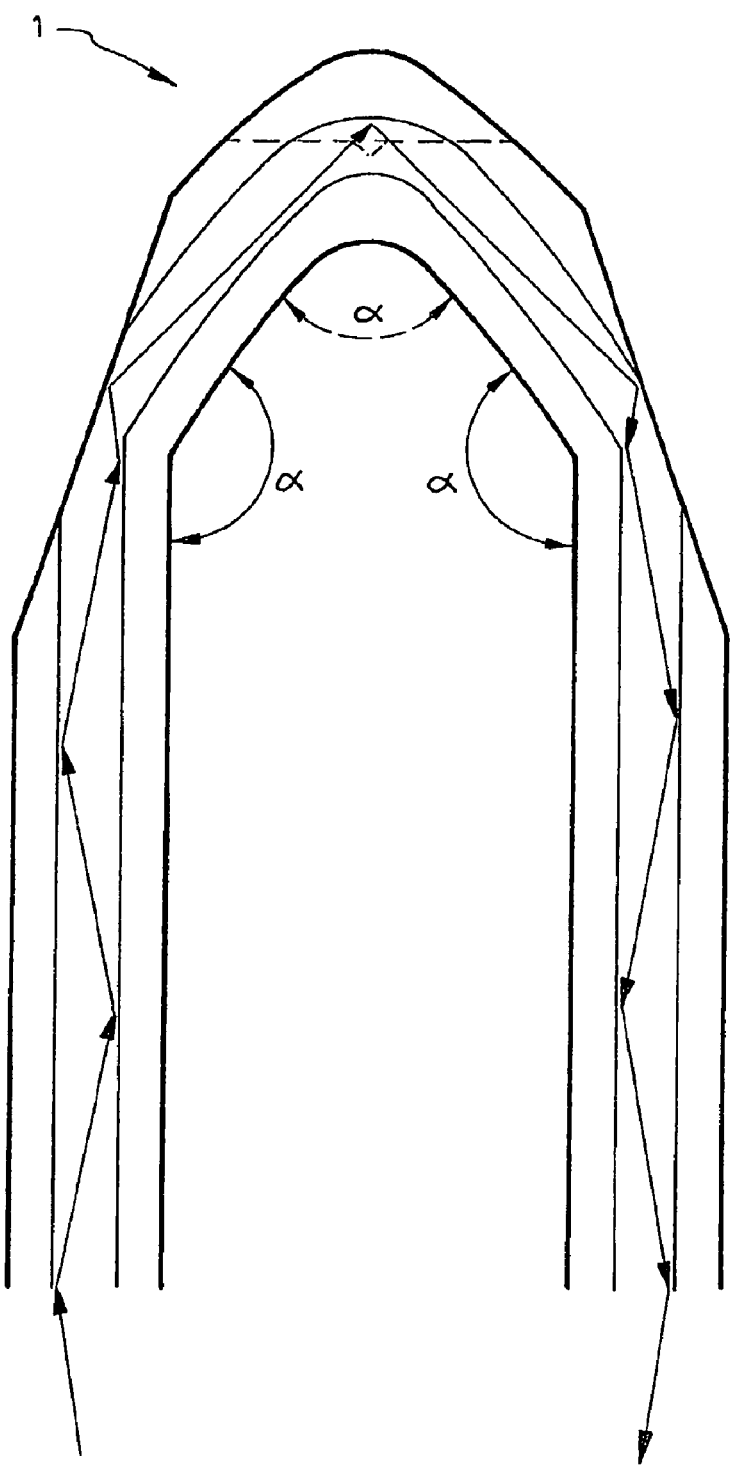
FIG. 5 is a general diagram showing another sensing optical waveguide device of an optical waveguide sensor according to another preferred embodiment of the present invention.

For increasing the sensitivity of the optical waveguide sensor 10, one can provide an optical waveguide sensor device 10 having more than one sensing reflection interface 35. Referring now to FIGS. 3 to 5, there are shown different embodiments of a sensing optical waveguide device 1 of the optical waveguide sensor 10. In the illustrated embodiments, the sensing optical waveguide device 1 includes a plurality of pairs of input and output optical waveguide segments 9, 11. Preferably, such optical waveguide segments are optical fiber segments. These pairs are consecutively connected to one another for providing a continuous core portion between each segment. These pairs could also be provided in a single bent optical waveguide. Referring to FIG. 3, there is shown a sensing optical waveguide device 1 provided with two pairs of input and output fiber segments 9, 11, thereby providing two reflection interfaces 35. The input segment 9 of the second set is connected to the output segment 11 of the first set. Preferably, this connection will be adapted to prevent any Fresnel loss. The light beam 7 launched into the input segment 9 of the first pair partially reflects on the first reflection interface 35. This reflected fraction reaches the second interface and partially reflects thereon before reaching the light detector 55. In the illustrated case, the sensing optical waveguide device 1 thus has a W-shape provided with two reflection interfaces 35. In that case, the square of the optical power reflection coefficient R is relevant because two reflections are involved at the same incidence angle. This sharper response may be very valuable when one needs to measure a refractive index with a more accurate precision, over a narrow range. In another preferred embodiment of the sensing optical waveguide device 1 of a sensor 10, which is illustrated in FIG. 4, the two sets of input and output optical waveguide segments 9, 11 are arranged side by side, each segment forming an angle $\alpha$ with each adjacent segment. A third reflection interface 35 is then provided at the intersection of the two sets. Thus, such an arrangement forms a W-shaped sensing optical waveguide device 1 provided with three reflection interfaces 35. In that case, the cube of the optical power reflection coefficient R is relevant because three reflections are involved at the same incidence angle. Of course, any number of sensing reflection interfaces 35 could be used. Referring now to FIG. 5, there is shown another sensing optical waveguide device 1 of a sensor 10 using two sets of optical fiber segments 9, 11 each being connected together. In the illustrated embodiment, the two sets of segments 9, 11 are coupled to another in a jagged U-shaped arrangement, each of the segments 9, 11 forming an angle $\alpha$ with an adjacent segment 9, 11. Thus, two reflection interfaces 35 are provided. As can be seen, an optional third reflection interface 35 may be provided at the intersection of the two sets.

The optical waveguide sensor 10 described above is compact and its manufacturing is simple thanks to the use of known optical waveguide machining methods. Such a sensor may be used in a great variety of applications such as, for example, the determination of a concentration in the field of the food-processing industry.

As explained above, and referring again to FIG. 1, such a prismatic reflection optical waveguide device 1 can also be used as an integrated bent optical waveguide device. Such a device may for example be integral to an optical waveguide used in any type of optical waveguide system. The reflection interface 35 in the coupling portion works as a mirror by total internal reflection for reflecting the light beam coming from the input segment 9 into the output segment 11. The angle $\alpha$ has a value selected to provide a generally lossless transmission of the light beam 7 between the input and output optical waveguide segments 9 and 11. The flattened surface, which may be slightly curved as already explained, has an angular orientation with respect to each light guiding axis 17, 19 of each optical waveguide segment 9, 11, allowing to reflect a light beam generally lossless. It is to be understood that throughout the present description, the expression "generally lossless" is intended to mean without loss by transmission of light into the adjacent medium present at the substantially flattened surface. By contrast, an optical fiber provided with an integral cladding and which is significantly bent will generate such losses by transmission of light into the cladding. However, it should be noted that, given the fact that an optical waveguide has a finite numerical aperture, some of the light beams entering into the input optical waveguide segment 9 are not parallel to the light guiding axis of the waveguide segment 9. Thus, all beams reflect on the reflection interface 35 but some of them are not geometrically coupled into the output segment 11. Thus, it should be understood that the present device does not allow a perfect lossless transmission because there is always a small power loss due to the numerical aperture of the optical waveguide segment. Nevertheless, providing a generally lossless integrated bent optical waveguide device will be very useful in many waveguide applications.

As explained above, a plane wave incident on a material interface with air at an angle α/2 will undergo total internal reflection if α/2 is greater than a minimum angle given by:

$$\alpha/2 > \arcsin(1/n_{co}) + \arcsin(NA/n_{co})$$

where $n_{co}$ is the refractive index of the continuous core portion of the optical waveguide device 1 whereas NA is the numerical aperture of the optical waveguide segments 9 and 11. Consequently, from a practical point of view, the bent optical waveguide device 1 will provide a generally lossless transmission for a minimum selected typical value of α/2 of about 42 to 45 degrees for standard optical waveguide segments and for an exposition of the reflection interface 35 to the air. Therefore, the bent optical waveguide device is able to transmit and redirect the light beam 7 at an angle varying from 0 degree (straight optical fiber segment) to about 90 to 95 degrees without generating any transmission loss when the reflection interface 35 is exposed to the air. Of course, these values will be modified according to the refractive index of the medium on which the reflection interface 35 will be exposed. Therefore, the selected angle α will be chosen according to the refractive indices of the exposed core and surroundings, which is often the air, but such a device may also be used in any other environment. A first typical example is the use of a fused silica core having a refractive index $n_{co}$ of 1.457, a numerical aperture NA of 0.12, the reflection interface 35 being exposed to the air ($n_2=1$). This arrangement gives α greater than 96.2 degrees and can therefore deflect the light beam 7 from 0 to about 84 degrees. A second typical example uses the previous arrangement except that the numerical aperture NA is 0.22. Such an arrangement gives a greater than 104 degrees and can therefore providing a light redirection varying from 0 to about 76 degrees.

The bent optical waveguide device 1 may advantageously be provided with a reflecting coating extending on the reflection interface 35. The reflection coating may be a dielectric layer adapted to the wavelength and the incidence angle of the light beam 7, or may also be a metallic deposition, such as an aluminum layer for example. In such a case, the reflection interface 35 works as a mirror and reflects the light beam 7 providing generally lossless transmission for a significantly wider range of α, from 0 degree to a value close to 180 degrees.

Obviously, where it will be useful, such a bent optical waveguide device 1 could be provided with a plurality of pairs of input and output optical waveguide segments. Each pair is optically coupled to one another in a consecutive arrangement for providing a plurality of reflection interfaces 35 along a path of said light beam 7.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A prismatic reflection optical waveguide device transmitting a light beam interacting with an external medium, said device comprising:
   a pair of input and output optical waveguide segments, each being respectively provided with a core for propagating said light beam along a light guiding axis, a coupling end and a free end opposed thereto, the coupling ends of the input and output waveguide segments defining a coupling portion wherein said coupling ends are arranged in adjacent V-shaped relationship forming a predetermined angle α with each other, the input and the output optical waveguide segments being distinct segments, the coupling end of each segment being provided with an end surface forming an angle α/2 with the light guiding axis of the corresponding waveguide segment, the two end surfaces being connected flush with each other by connecting means, the cores of the input and output segments at the coupling ends thereof forming a continuous core portion for conveying said light beam, said continuous core portion having a substantially flattened surface in said coupling portion defining a reflection interface between said device and said external medium to expose said continuous core portion in said coupling portion to said external medium through said interface, said reflection interface being configured to convey the light beam coming from the input segment into the output segment by a single reflection thereof.

2. The prismatic reflection optical waveguide device according to claim 1, wherein each of said input and output optical waveguide segments is an optical fiber segment having a cladding surrounding said core.

3. The prismatic reflection optical waveguide device according to claim 1, wherein the connecting means comprises a glue having a refractive index substantially matching a refractive index of the cores of the input and output segments.

4. The prismatic reflection optical waveguide device according to claim 1, wherein the connecting means comprises a liquid having a refractive index substantially matching a refractive index of the cores of the input and output segments, said connecting means further comprising a mechanical holder for keeping in place said two end surfaces.

5. The prismatic reflection optical waveguide device according to claim 1, wherein the connecting means comprises a welding of said end surfaces.

6. The prismatic reflection optical waveguide device according to claim 5, wherein the welding of said end surfaces is a laser-based welding.

7. A prismatic reflection optical waveguide device transmitting a light beam interacting with an external medium, said device comprising:
   a pair of input and output optical waveguide segments, each being respectively provided with a core for propagating said light beam along a light guiding axis, a coupling end and a free end opposed thereto, the coupling ends of the input and output waveguide segments defining a coupling portion wherein said coupling ends are arranged in adjacent V-shaped relationship forming a predetermined angle α with each other, the cores of the input and output segments at the coupling ends thereof forming a continuous core portion for conveying said light beam, said continuous core portion having a substantially flattened surface in said coupling portion defining a reflection interface between said device and said external medium to expose said continuous core portion in said coupling portion to said external medium through said interface, said reflection interface being configured to convey the light beam coming from the input segment into the output segment by a single reflection thereof, the reflection interface in the continuous core portion being a plane surface, said plane surface of the reflection interface forming an angle $\pi/2-\alpha/2$ with respect to the light guiding axis of each optical waveguide segment.

8. The prismatic reflection optical waveguide device according to claim 7, wherein said reflection interface extends across an intersection of the light guiding axes of the input and output optical waveguide segments.

9. The prismatic reflection optical waveguide device according to claim 7, wherein each of said input and output optical waveguide segments comprises an optical fiber segment having a cladding surrounding said core.

* * * * *